(12) United States Patent
Neely

(10) Patent No.: US 7,508,606 B2
(45) Date of Patent: *Mar. 24, 2009

(54) METHOD OF ALIGNING THE UPPER AND LOWER CENTERING BELLS OF A LENS DOUBLET ASSEMBLY MACHINE

(75) Inventor: Ron Neely, Aloha, OR (US)

(73) Assignee: Flextronics AP LLC, Broomfield, CO (US)

( * ) Notice: Subject to any disclaimer, the term of this patent is extended or adjusted under 35 U.S.C. 154(b) by 143 days.

This patent is subject to a terminal disclaimer.

(21) Appl. No.: 11/495,330

(22) Filed: Jul. 28, 2006

(65) Prior Publication Data
US 2007/0037485 A1    Feb. 15, 2007

Related U.S. Application Data

(60) Provisional application No. 60/703,531, filed on Jul. 29, 2005.

(51) Int. Cl.
*G02B 7/02* (2006.01)
(52) U.S. Cl. .................. 359/821; 359/819; 359/822
(58) Field of Classification Search ......... 359/819–823, 359/694–703
See application file for complete search history.

(56) References Cited

U.S. PATENT DOCUMENTS

| | | | | |
|---|---|---|---|---|
| 2,279,372 A | 4/1942 | Herzberger | ............... | 88/57 |
| 3,087,384 A | 4/1963 | Baur et al. | ............... | 88/57 |
| 3,599,377 A | 8/1971 | Dartnell | ............... | 51/284 |
| 3,609,270 A | 9/1971 | Jorgensen et al. | ............... | 200/67 |
| 4,879,592 A | 11/1989 | Ernest | ............... | 358/42 |
| 5,016,993 A | 5/1991 | Akitake | ............... | 359/696 |
| 5,095,204 A | 3/1992 | Novini | ............... | 250/223 B |
| 5,177,638 A | 1/1993 | Emura et al. | ............... | 359/704 |
| 5,196,963 A | 3/1993 | Sato et al. | ............... | 359/699 |
| 5,272,567 A | 12/1993 | Inoue | ............... | 359/696 |
| 5,546,147 A | 8/1996 | Baxter et al. | ............... | 354/187 |
| 5,754,210 A | 5/1998 | Haneda et al. | ............... | 347/116 |
| 5,805,362 A * | 9/1998 | Hayes | ............... | 359/819 |
| 5,835,208 A * | 11/1998 | Hollmann et al. | ............... | 356/124 |
| 5,926,965 A | 7/1999 | Shijo et al. | ............... | 33/390 |
| 5,954,192 A | 9/1999 | Iitsuka | ............... | 200/336 |

(Continued)

FOREIGN PATENT DOCUMENTS

EP    1148406 A2    10/2001

(Continued)

OTHER PUBLICATIONS

"High Precision Optical Assembly Starts Here," (4 pages) 1996, Opto-Alignment Technology, Inc.

*Primary Examiner*—Mohammed Hasan
(74) *Attorney, Agent, or Firm*—Haverstock & Owens LLP

(57) ABSTRACT

A method for aligning the upper and lower centering bells of a lens doublet assembly machine is provided. In one example of the method, the method includes positioning an alignment tool with respect to a base plate of the lens doublet aligning apparatus; positioning an upper bell shaft with respect to the alignment tool, wherein the upper bell shaft includes an upper bell chuck at a lower end of the upper bell shaft; and tightening flexural bearings around an outer radial edge of the upper bell shaft, wherein the flexural bearings precisely hold the upper bell shaft into perpendicular alignment in the lens doublet aligning apparatus.

16 Claims, 10 Drawing Sheets

U.S. PATENT DOCUMENTS

| | | | |
|---|---|---|---|
| 5,966,248 A | 10/1999 | Kurokawa et al. | 359/697 |
| 6,091,902 A | 7/2000 | Komatsuzaki et al. | 396/60 |
| 6,292,306 B1 * | 9/2001 | Betensky | 359/663 |
| 6,330,400 B1 | 12/2001 | Bittner et al. | 396/72 |
| 6,417,601 B1 | 7/2002 | Kim | 310/333 |
| 6,597,516 B2 * | 7/2003 | Saitoh et al. | 359/694 |
| 6,760,167 B2 | 7/2004 | Meehan et al. | 359/822 |
| 6,762,888 B1 | 7/2004 | Oshima | 359/696 |
| 6,805,499 B2 | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,088,525 B2 | 8/2006 | Finizio et al. | 359/703 |
| 7,193,793 B2 | 3/2007 | Murakami et al. | 359/791 |
| 7,301,712 B2 | 11/2007 | Kamo | 359/785 |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi et al. | 348/335 |
| 2002/0018140 A1 | 2/2002 | Suemoto et al. | 348/358 |
| 2002/0102946 A1 | 8/2002 | SanGiovanni | 455/90 |
| 2003/0174419 A1 | 9/2003 | Kindler et al. | 359/819 |
| 2004/0056970 A1 | 3/2004 | Westerweck et al. | 348/240.3 |
| 2004/0203532 A1 | 10/2004 | Mizuta | 455/90.3 |
| 2004/0258405 A1 | 12/2004 | Shiratori et al. | 396/458 |
| 2005/0264670 A1 | 12/2005 | Yamaguchi et al. | 348/335 |
| 2006/0049720 A1 | 3/2006 | Henderson et al. | 310/328 |
| 2006/0056389 A1 | 3/2006 | Monk et al. | 370/352 |
| 2006/0113867 A1 | 6/2006 | Sakatani et al. | 310/323.17 |
| 2006/0291061 A1 | 12/2006 | Iyama et al. | 359/614 |
| 2007/0053672 A1 | 3/2007 | Westerweck et al. | 396/79 |
| 2007/0074966 A1 | 4/2007 | Yamamoto et al. | 200/547 |
| 2007/0086777 A1 | 4/2007 | Fujita | 396/452 |

FOREIGN PATENT DOCUMENTS

| | | |
|---|---|---|
| EP | 1148406 A3 | 6/2002 |
| EP | 1357726 A1 | 10/2003 |
| GB | 1378515 | 12/1974 |
| GB | 2315186 A | 1/1998 |
| GB | 2387063 A | 10/2003 |
| JP | 11-72678 | 3/1999 |
| JP | 2002-286987 | 10/2002 |

* cited by examiner

METHOD OF ALIGNING THE UPPER AND LOWER CENTERING BELLS OF A LENS DOUBLET ASSEMBLY MACHINE

RELATED APPLICATIONS

This Patent Application claims priority under 35 U.S.C. 119(e) of the co-pending U.S. Provisional Pat. App. No. 60/703,531, filed Jul. 29, 2005, entitled "Method for Aligning the Upper and Lower Centering Bells of a Lens Doublet Assembly Machine", which is hereby incorporated by reference.

FIELD OF THE INVENTION

The present invention relates to lens doublets for cameras. More particularly, the present invention relates to techniques and machines for aligning lens doublets for cameras.

BACKGROUND OF THE INVENTION

Correctional Lens Doublets consist of two lenses generally made of different optical materials attached to each other to derive better optical performance over wavelengths of interest. Currently, the most popular methods of achieving micron level centration of the two pieces of lens doublets involve active alignment or other methods. Unfortunately, these methods are slow, high in cost and not amenable to volume production. The problem of centration is even more difficult for very small lens pieces such as used in handheld cameras or cell phone cameras.

Active alignment involves passing an optical beam through the lenses or lens assemblies. Controlled movement of the lenses is executed using the location of the projected beam image for feedback. The Laser Alignment and Assembly Station™ of Opto-Alignment Technology, Inc. is an example of a apparatus that utilizes active alignment. A rotating air bearing stage has X-Y-theta-phi adjustments to set the lens barrel or other optic holder to run true to serve as a reference. Then a reflection from a laser imaged on a CCD camera is used to center multiple optical elements.

There are several ways in which the lens can be centered on the bell-shaped centering bell. Many of these methods are discussed with figures in "Fabrication Methods for Precision Optics," by Hank H. Karow. Brief descriptions are provided here.

An older transfer spindle method is still used for prototype and low-volume production and for centering lenses made from soft and sensitive materials. According to Karow, the lens is mounted on a precise centering bell which is fastened on a thread to a precision spindle. This centering bell is nearly always made of brass, although steel bells are sometimes used as well. The lens is mechanically or optically aligned on the centering bell so that the optical and mechanical axes of the lens are coincident. The spindle with the centered lens is then mounted in a centering machine, which is used to grind the diameter of the lens concentric to the axis of rotation.

In one centering method, the lens and the centering bell are heated sufficiently so that a small amount of a specially formulated centering wax can be applied to the edge of the centering bell. The heated lens is then positioned on the centering bell by mechanical means or by an optical alignment method. For the mechanical method, the edge thickness variations must be nulled out or at least reduced to a minimum while the lens rotates. The run-out is monitored by means of a digital indicator.

Another centering method is an optical method that relies on light reflected off the outer surface of the lens. The lens is mounted on a centering bell, which rotates the lens. The centering bell is mounted to the spindle.

Yet another centering method is an optical method that relies on the rotation of a target image that is projected through the lens. A lamp, a collimating lens and mirrors form the target image and project the target image through the lens. The lens is mounted on the centering bell, which rotates the lens.

A laser beam alignment method is used for more critical centration requirements. It is quite similar to the target image projection method. Both of these optical centration methods are only useful for lenses made from visually transparent materials. Projection methods are not possible for infrared materials and metal optics because they are not transparent in the visible region of the spectrum.

Another centering method is bell chuck centering for small lenses. Using two coaxial bell chucks to align a single lens to the chuck axis. The lens is typically arranged horizontally. Bell chuck centering is a method in which a suitably curved lens is self-centering when clamped between identical and precision aligned brass centering bell or bell chucks. Bell chuck centering is a purely mechanical method that relies on the fact that the lens will slide along the edge of the bell chuck until it seats itself at the zone of equal edge thickness. In this alignment the optical axis of the lens and the mechanical axis of the spindle become colinear. When the edges of the centering chucks are well rounded and polished, the lens surface will not be damaged, even at high chuck pressures. The bell chuck centering method with a horizontal spindle can be used for lenses with diameters as small as 3 mm and as large as 150 mm.

Still another centering method is bell chuck centering for larger lenses. Lenses up to 250 mm in diameter can be centered with this bell chucking method using vertically aligned spindles. For larger lenses, a vacuum assist method is necessary to reduce the otherwise required high clamping loads on the lens surfaces that can lead to damage.

Regarding centerability limitations, for the centering method known as transfer spindle, there is no theoretical optical limit on centerability, although some practical limits do exist. Even lenses with very weak optical power can be centered with this method as long as the centration error can be optically or mechanically detected. There is a well-defined centerability limit, however for the bell-chucking method. When the lens radii become too long, even strong forces will not prevent the lens from being displaced by the appreciable side pressures exerted by a side wheel typically formed of diamond. Before a lens production run is committed to a bell-chucking machine, it must first be determined if the lens can be safely, accurately and reproducibly centered this way.

The limit of centerability with the bell-chucking method is a function of the slide angle of the lens relative to the chuck edge and the coefficient of friction between lens and chuck. The motion component which can be derived from chuck pressure causes the lens to move between the bell chuck edges. This motion component must be large enough so that it can overcome the friction between the bell chuck edges and the lens surfaces. Since the value of this component depends on the shape of the lens, it is possible for it to become smaller than the friction component. The lens will then no longer slide between the bell chuck edges, and it can no longer be centered this way. The limit of centerability can be calculated from the lens diameter, the lens radii, and the coefficient of friction.

Doublet alignment is yet another prior art method based on aligning the doublet to equal lens edge thickness. The doublet includes a convex and a concave lense joined together. The two lenses of a cemented or joined doublet have a common optical axis.

For noncritical doublets it is sufficient to align the lenses by their common diameter. The doublet is put into a V-jig for this purpose. The cemented doublet is then centered as accurately as individual lenses. The centering tolerances can be additive, however.

A somewhat more accurate centering method for doublets uses a fixture in which the doublet is held in a lens holder. Mounted above the doublet is a centering bell on the same axis as the lens holder. This centering bell is lowered until it contacts the doublet, which will then automatically align the lense to an equal edge thickness. Alignment to equal edge thickness is also the principle on which an older instrument was based.

Doublets for high quality objectives are optically aligned. A transmitted light method is well known for which the setup is equipped with a collimator and a telescope. Systems are also used in which the light from an autocollimator passes through a doublet and is reflected back by a plane mirror.

Doublets can also be cemented and aligned to their common optical axis on a laser centering test unit. The cement is applied and evenly distributed. This method works best with UV cement. The lens pair is then placed on the centering chuck of the instrument where it is held by light vacuum pressure. The lower, typically concave, lens is pushed against a laterally attached V-stop which has been previously adjusted with a centered lens and locked into position.

The laser passes through a focusing apparatus that compensates for the refractive powers of the doublet. A plane mirror redirects the beam from there through the doublet, which then passes through the hollow spindle and impinges as a light spot on a detector plate. The detector is electronically coupled to an image screen that displays the light spot as a bright dot. A change in position of the light spot on the detector plane is seen magnified many times on the image screen. The upper lens is then shifted in such a way that the dot on the screen remains stationary as the spindle is rotated. The centered doublet is now irradiated with UV light The cement sufficiently precures in a few seconds, so then the cemented doublet can be removed from the centering chuck and fully cured later in a ultra violet light oven.

The Laser Alignment and Assembly Station™ by Opto-Alignment Technology, Inc., is an instrument to improve quality of assembly and inspection of precision and ultra-precision multi-element lens assemblies. The Laser Alignment and Assembly Station™ operates by reflecting a laser beam from any surface of an object being aligned or measured. A centering and tilt stage is mounted on an air bearing to bring the mechanical axis of a lens housing into collinear alignment with the incident test beam. The optical module provides a focused laser test beam which, when reflected from the surface under test, falls on a charge-coupled device (CCD) detector. If the surface is accurately centered, the reflection produces a stationary bright spot in the center of the video monitor. A misaligned surface will reflect the laser beam at an angle and displace the bright spot away from the center of the CCD. Rotation of the air bearing causes the decentered spot to orbit around the center of the CCD. The radius of the orbit viewed on a monitor is proportional to the tilt of the surface under test and is independent of its radius of curvature. A frame-grabber can be used to import the image to a computer and software can automate the measurements and store the data on the individual lenses and the entire lens assembly.

Voice coil linear actuators with flexural bearings are also part of prior art. The LFA-10 Linear Focus Actuator™ of Equipment Solutions Inc. is a positioning apparatus using such voice coil linear actuators. It was specifically developed for optical applications requiring both high precision and high-speed positioning over a short to medium stroke. The LFA-10 Linear Focus Actuator™ is well suited for optical focusing and other micropositioning applications such as scanning interferometry, surface structure analysis, disk drive testing, autofocus systems, confocal microscopy, biotechnology and semiconductor test equipment. The LFA-10 Linear Focus Actuator™ is guided along a single axis by a flexure design. The use of flexures within the design produces a compact and light package with zero stiction/friction, ultra-high resolution and exceptional guiding precision. This stage architecture allows it to be oriented in either a vertical or horizontal position. The LFA-10 Linear Focus Actuator™ uses a high force low mass moving voice coil architecture. The LFA-10 Linear Focus Actuator™ includes a sub-micron resolution linear displacement sensor.

All of the aforementioned methods are too slow to justify their capital cost of equipment and operator labor. Note that executing a lens alignment method using automated pick and place machines is possible. However, such a method is not accurate enough due to imperfections in lens outlines and poor correlation between the outline of the lens and its optical axis.

SUMMARY OF THE INVENTION

What is needed is an improved apparatus having features for addressing the problems mentioned above and new features not yet discussed. Broadly speaking, the present invention fills these needs by providing a method of aligning the upper and lower centering bells of a lens doublet assembly machine. It should be appreciated that the present invention can be implemented in numerous ways, including as a method, a process, an apparatus, a system or a device. Inventive embodiments of the present invention are summarized below.

In one embodiment, a method of bell chuck aligning in a lens doublet aligning apparatus is provided. The method comprises positioning an alignment tool with respect to a base plate of the lens doublet aligning apparatus. An upper bell shaft is positioned with respect to the alignment tool, wherein the upper bell shaft includes an upper bell chuck at a lower end of the upper bell shaft. Flexural bearings are tightened around an outer radial edge of the upper bell shaft, wherein the flexural bearings precisely hold the upper bell shaft into perpendicular alignment in the lens doublet aligning apparatus.

In another embodiment, a method of aligning a lower chuck with respect to an upper bell chuck of a lens doublet aligning apparatus is provided. The method comprises clamping a bell alignment ball between the upper bell chuck and the lower chuck. The lower chuck is translated radially with respect to the upper bell chuck. The lower chuck is aligned into a coaxial alignment position with the upper bell chuck. The lower chuck is locked into the coaxial alignment position.

In still another embodiment, an apparatus for aligning an upper bell chuck of a lens doublet aligning apparatus is provided. The apparatus comprises an upper bell chuck. An upper bell shaft has the upper chuck attached at a lower end of the upper bell shaft. One or more flexural bearings are included, wherein the one or more flexural bearings support the upper bell shaft in an upright position, such that the upper bell shaft traverses through a center of the one or more flexural bearings. A flexural bearing housing is attached to outer radial edges of the flexural bearings, wherein the flexural bearing housing supports the one or more flexural bearings within the flexural bearing housing. A base plate supports a lower chuck and the flexural bearing housing on an upper portion of the base plate. An alignment tool shares coaxial alignment with the base plate.

In yet another embodiment, an apparatus for aligning a lower chuck with respect to an upper bell chuck of a lens doublet aligning apparatus is provided. The apparatus comprises an upper bell chuck. An upper bell shaft has the upper chuck attached at a lower end of the upper bell shaft. One or more flexural bearings, support the upper bell shaft in an upright position, wherein the upper bell shaft traverses through a center of the one or more flexural bearings. A flexural bearing housing is attached to outer radial edges of the flexural bearings, wherein the flexural bearing housing supports the one or more flexural bearings within the flexural bearing housing. A base plate supports the lower chuck and the flexural bearing housing on an upper portion of the base plate. An alignment ball is clamped between the upper bell chuck and the lower chuck.

The invention encompasses other embodiments are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENT

An invention for a method of aligning the upper and lower centering bells of a lens doublet assembly machine is disclosed. Numerous specific details are set forth to provide a thorough understanding of the present invention. It will be understood, however, to one skilled in the art, that the present invention can be practiced with other specific details. Two different methods of lens doublet aligning are disclosed depending on the centration requirements as shown in the diagrams below.

Overview of Lens Doublet Aligning

Figure 1:
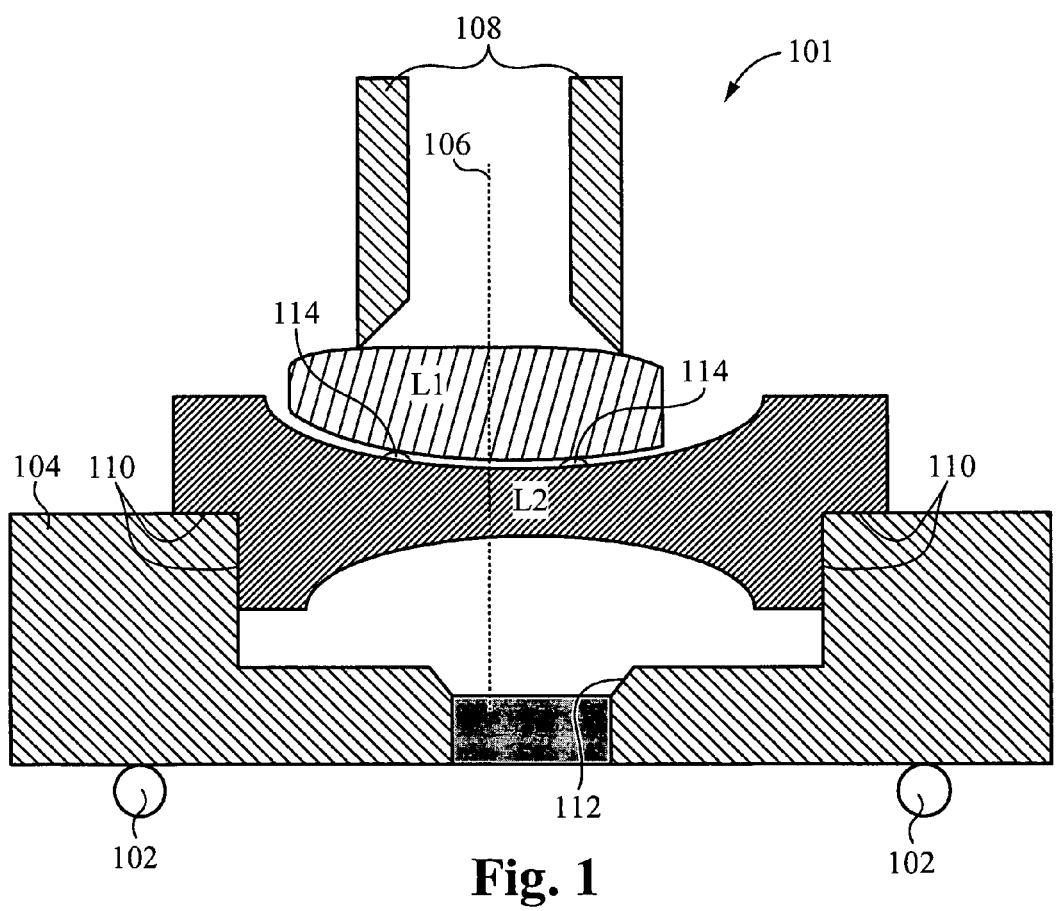
FIG. 1 shows an aligning method in which an upper lens is aligned with respect to the top surface of a lower lens, in accordance with an embodiment of th present invention.

FIG. 1 shows an aligning apparatus 101 in which an upper lens L1 is aligned with respect to the top surface of a lower lens L2, in accordance with an embodiment of the present invention. The lower lens L2 is preferably precisely held to be horizontal via edge datums 110 shared between the lower lens L2 and a lockable lower chuck 104. The chamfer 112 is a groove formed in the lockable lower chuck 104 by precisely cutting the lockable lower chuck 104 such that the lockable lower chuck 104 meets the lower lens L2 at edge datums 110. Edge datums 110 are precise edges shared between the lower lens L2 and the lockable lower chuck 104.

The lockable lower chuck 104 is allowed to translate radially in any direction to allow the upper lens L1 to be seated in proper alignment on a raised ring 114 of the lower lens L2. The raised ring 114 is molded as a part of the lower lens L2. The raised ring 114 has a thickness of between about 10 μm and about 15 μm. The raised ring 114 allows the lower lens L2 to behave as a lower bell. Accordingly, the raised ring 114 serves as a lower bell contact and as a spacer to maintain a correct adhesive gap between the upper lens L1 and the lower lens L2. The raised ring 114 allows the upper lens L1 to self-align to the lower lens L2. Supporting precision balls 102 allow such radial and horizontal translation of the lockable lower chuck 104 in any direction. There are at least three supporting balls 102 to support the lockable lower chuck 104. The precision balls 102 are surrounded by a thin layer of grease to hold the precision balls 102 in place during assembly and to reduce wear during use. The upper bell chuck 108 precisely guides the upper lens L1 into the proper position with respect to the top surface of the lower lens L2.

Figure 2:
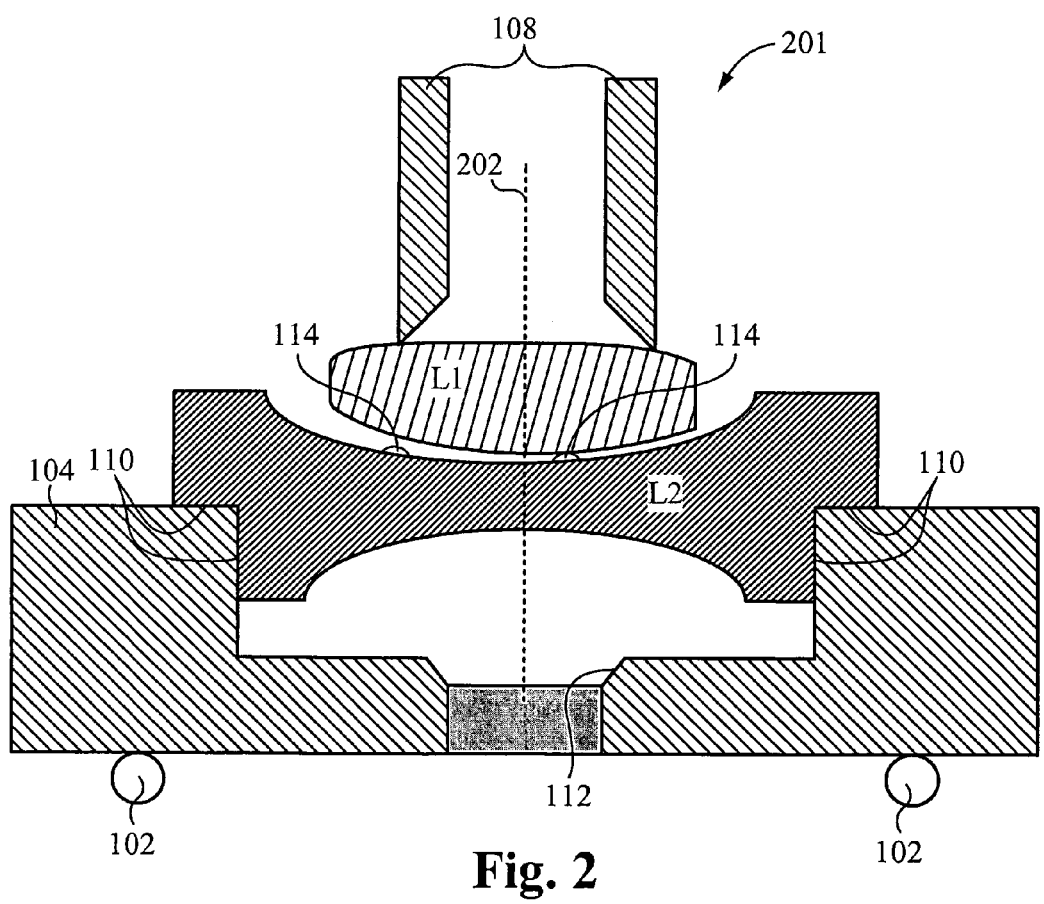
FIG. 2 shows an aligning method in which an upper lens is aligned with respect to edge datums shared by the lower lens and a lower chuck, in accordance with an embodiment of the present invention.

FIG. 2 shows an aligning apparatus 201 in which an upper lens L1 is aligned with respect to the edge datums 110 shared by the lower lens L2 and the lockable lower chuck 104, in accordance with an embodiment of the present invention. The lockable lower chuck 104 (or bottom fixture) is held fixed after alignment with respect to the upper bell chuck 108. Such an arrangement allows alignment 202 of the upper lens L1 with respect to the edge datums 110.

The choice of techniques, between the apparatus of FIG. 1 and FIG. 2, depends on the desired optical characteristics of the doublet and the tolerances of various features on the lower lens L2. Note that lack of symmetry between the lenses is exaggerated in FIG. 1 and FIG. 2 to highlight the differences in the two methods.

An important aspect of the present invention is the use of supporting precision balls 102 to align the upper lens L1 with respect to the lower lens L2. There are at least three supporting balls 102 to support the lockable lower chuck 104. In the apparatus of FIG. 1, the lenses are self-aligned by contact of their shared optical interfaces. This self-aligning is enabled by the radial freedom of the lockable lower chuck 104. Another important aspect of the present invention is the use of supporting precision balls 102 to align the upper bell chuck 108 with respect to the lockable lower chuck 104. The bell chuck aligning occurs in an earlier step before the lens aligning. During the bell chuck aligning, the lockable lower chuck 104 is free to move radially with respect to each other until locked in alignment by meltable wax or any alternative method of attachment such as epoxy adhesive. However, before the lens aligning apparatus can be utilized to align the upper lens L1 with respect to the lower lens L2, the upper bell chuck 108 needs to be calibrated or aligned with respect to the lockable lower chuck 104.

Details of Bell Chuck Aligning

Figure 10:
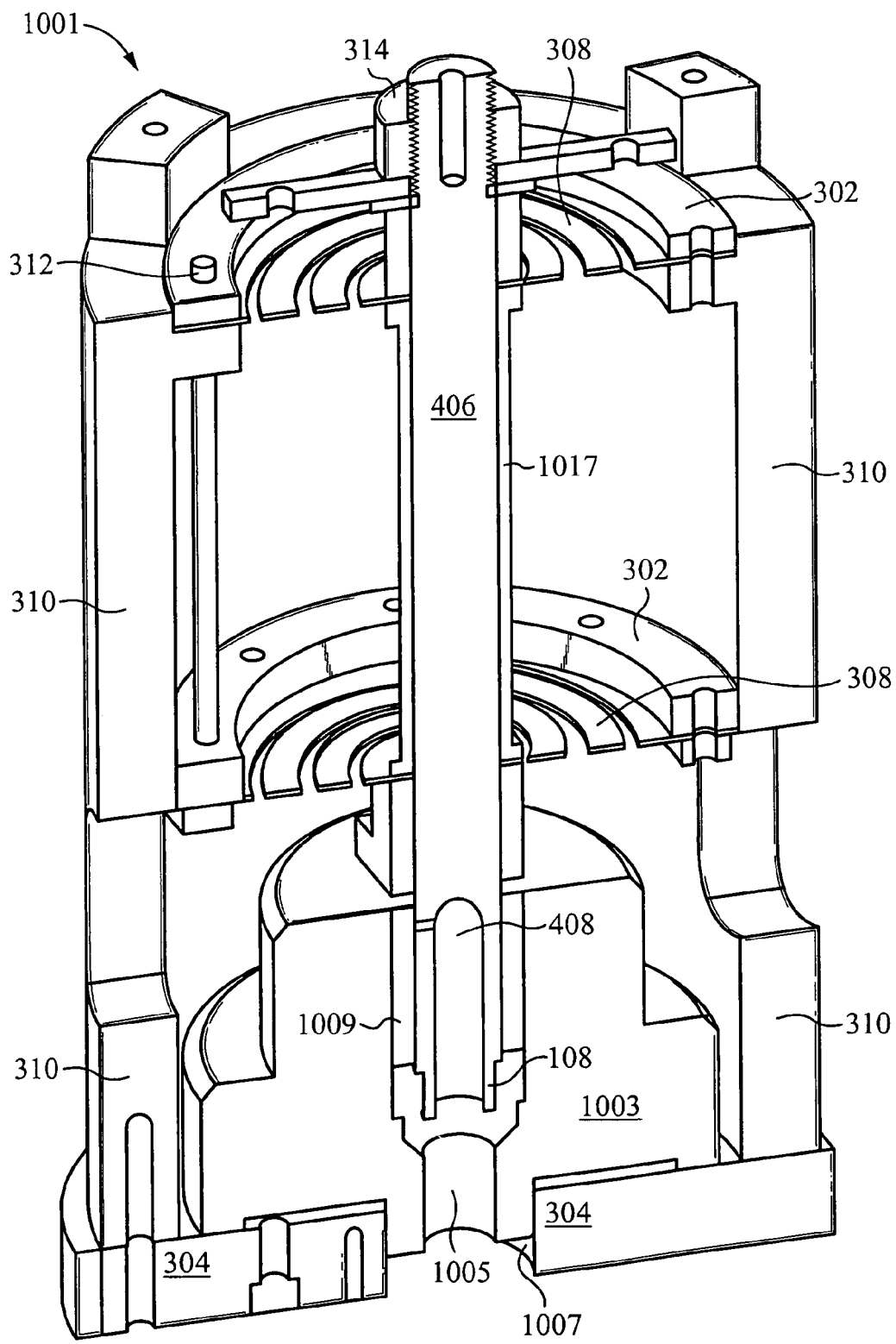
FIG. 10 is an isometric cross-sectional view of the lens aligning apparatus during a bell alignment process of the upper bell chuck, in accordance with an embodiment of the present invention.

FIG. 10 is an isometric cross-sectional view of the lens aligning apparatus during a perpendicularity aligning process 1001 of the upper bell chuck 108, in accordance with an embodiment of the present invention. The lens aligning apparatus is fitted with an alignment tool 1003 for perpendicularity. The alignment tool 1003 ensures perpendicularity of the upper bell chuck 108 with respect to the base plate 304. A base plate bore 1007 positions the alignment tool 1003 with respect to the base plate 304. The alignment tool 1003 includes a threaded hole 1005 for clamping the alignment tool 1003 with respect to the base plate 304. A sleeve 1009 positions the upper bell shaft 406 with respect to the alignment tool 1003 by contacting an outer radial edge of the upper bell shaft 406. The sleeve 1009 shares a coaxial center with the alignment tool 1003 and is supported in the alignment tool 1003. After the upper bell shaft 406 is positioned into alignment by the alignment tool 1003, the flexural bearings 308 are tightened around the outer radial edge of the upper bell shaft 406 using flexural clamps 302. The flexural bearings 308 hold the upper bell shaft 406 such that the upper bell shaft 406 passes through a center axis of the flexural bearing housing 310 and the flexural bearings 308. The flexural bearings 308 preferably precisely hold the upper bell shaft 406 into perpendicular alignment and a centered position in the lens alignment apparatus. The upper bell chuck 108 is part of a lower end of the upper bell shaft 406. The upper bell chuck 108 and the upper bell shaft 406 share a coaxial axis. Accordingly, positioning the upper bell shaft 406 automatically positions the upper bell chuck 108.

The alignment tool 1003 is bolted to the base plate 304 with a screw through the base plate bore 1007. The alignment tool 1003 comprises low coefficient of thermal expansion (CTE) material, preferably 6061-T6 aluminum. The sleeve 1009 is comprises a higher CTE material, preferably acetal. The upper bell shaft 406 is preferably 303 stainless steel. The alignment tool 1003, the sleeve 1009, the base plate 304 and the upper bell chuck 108, including the upper bell shaft 406, are cooled in a refrigerator, preferably to approximately −20° C. The parts are then removed from the refrigerator. Before significant warming can occur, the alignment tool 1003 with attached base plate 304 is mated to the upper bell chuck 108 by inserting the upper bell chuck 108 into the alignment tool 1003 to a depth that will result in the flexural bearings 308 remaining planar during a subsequent step.

The combination alignment tool 1003 with base plate 304 is then allowed to warm to room temperature after which the remaining parts from the lens aligning apparatus are fitted to the combination. The flexural bearings 308 are then clamped into alignment at their inner and outer surfaces by tightening a top nut 314 at the top of the upper bell shaft 406 and the flexural clamp nuts 312 fastening the flexural clamps 302.

The entire lens aligning apparatus as shown in FIG. 10 is returned to the refrigerator and cooled, preferably to approximately −20° C. The lens aligning apparatus is then removed from the refrigerator. The alignment tool 1003 is removed by unscrewing the screw holding the alignment tool 1003 to the base plate 304, detaching the base plate 304 from the flexural bearing housing 310, and slipping the alignment tool 1003 off the upper bell chuck 108. These steps, after removing the lens aligning apparatus from the refrigerator, are preferably carried out quickly while the cooled components are still cold.

Substantially all the parts shown in FIG. 10 are then allowed to warm to room temperature before the base plate 304, without the alignment tool 1003, is fastened to the flexure housing 310 with screws (not shown). The screws are set to a torque that matches that used during the room temperature flexure alignment, described above, to replicate any part distortions that may have resulted from the attachment forces.

The axis of the upper bell chuck 108 is now perpendicular to the top surface of the base plate 304. The perpendicularity is defined by the outside shaft diameter, or outer radial edge, of the upper bell shaft 406 with respect to a top surface of the base plate 304. The sleeve 1009 is preferably machined with dimensions such that at room temperature the sleeve 1009 has a tight interference fit with the alignment tool 1003 and the upper bell shaft 406. However, the machining should allow the sleeve 1009 to maintain an interference fit with the alignment tool 1003 at approximately −20° C., but with a movable fit between the sleeve 1009 and the upper bell shaft 406, thereby allowing insertion and removal of the alignment tool 1003. Such thermal properties of the components allows the upper bell chuck 108 to be held rigidly in perpendicular alignment with the base plate at the operating temperature, in other words, room temperature. The base plate bore 1007 with a stub (not shown) on the alignment tool 1003 ensures that all screw hole patterns will be in sufficient alignment to allow the flexure bearings 308 to align to the upper bell shaft 406. The perpendicularity aligning process 1001 is then complete.

Figure 11:
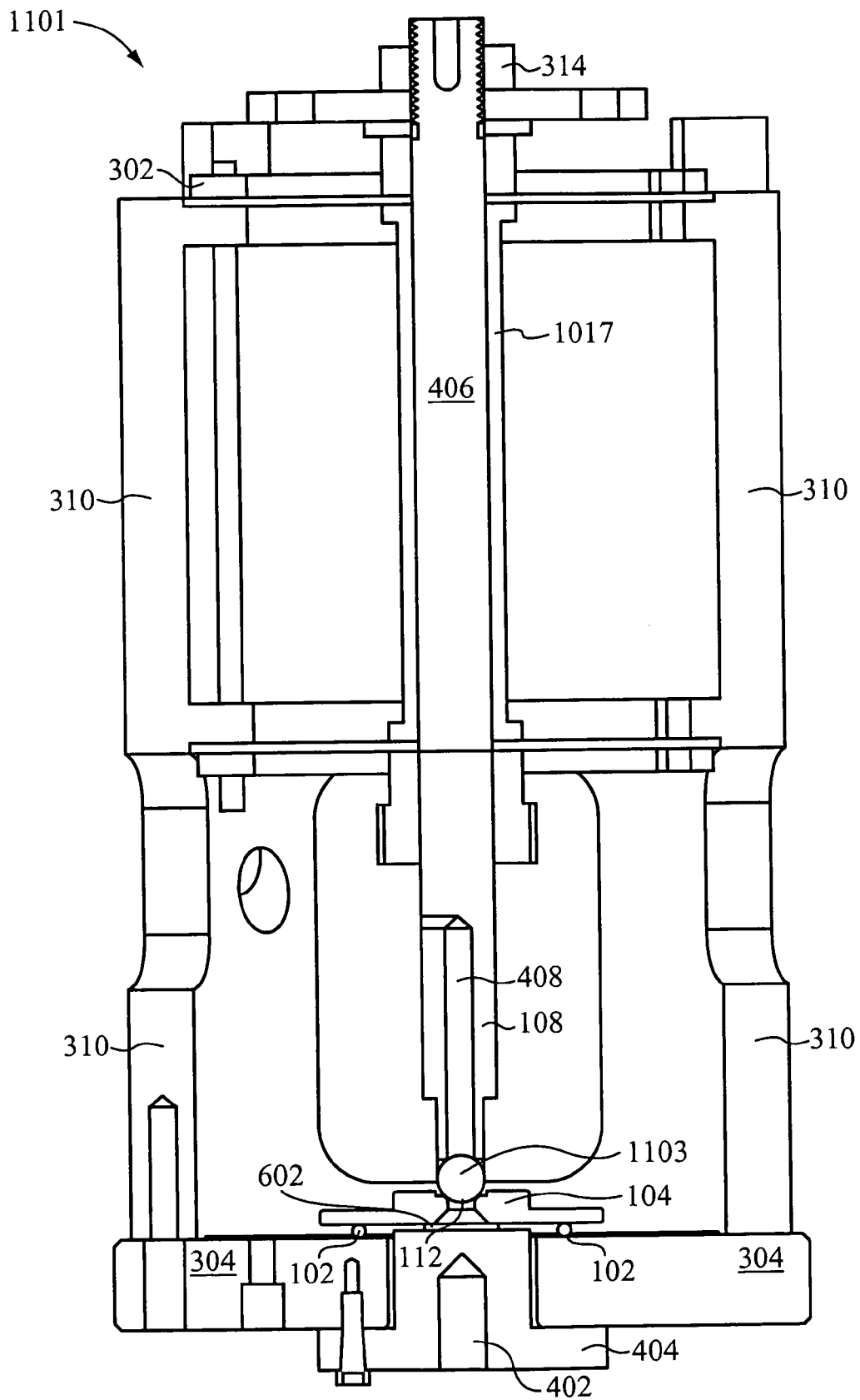
FIG. 11 shows the lens aligning apparatus during a bell aligning of the lower chuck with respect to the upper bell chuck, in accordance with an embodiment of the present invention.

FIG. 11 shows the lens aligning apparatus during a coaxial aligning process 1101 of the lockable lower chuck 104 with respect to the upper bell chuck 108, in accordance with an embodiment of the present invention. The upper bell is aligned to the lower bell by clamping a bell alignment ball 1103 between the upper bell chuck 108 and lockable lower chuck 104 while allowing the lockable lower chuck 104 to translate radially. The lockable lower chuck 104 is initially free to translate radially. The lockable lower chuck 104 translates radially by rolling on its supporting precision balls 102 positioned between the lockable lower chuck 104 and the base plate 304. There are preferably three supporting precision balls 102 preferably evenly positioned at approximately 120 degree spacing near the periphery of the lockable lower chuck 104 to allow radial translation. The clamping force is applied to the voice coil actuator 306 of FIG. 3, thereby moving the upper bell chuck 108 downward. The lockable lower chuck 104 is preferably locked into the aligned position by a curing epoxy 602. The curing epoxy 602 is already pre-applied between the underside of the lockable lower chuck 104 and the pedestal just underneath the underside of the lockable lower chuck 104. The curing epoxy 602 is also pre-applied to the supporting precision balls 102. After the epoxy has cured, the clamping force and bell alignment ball 1103 are removed to complete the alignment process of the upper lens L1 and lower lens L2.

Figure 12:
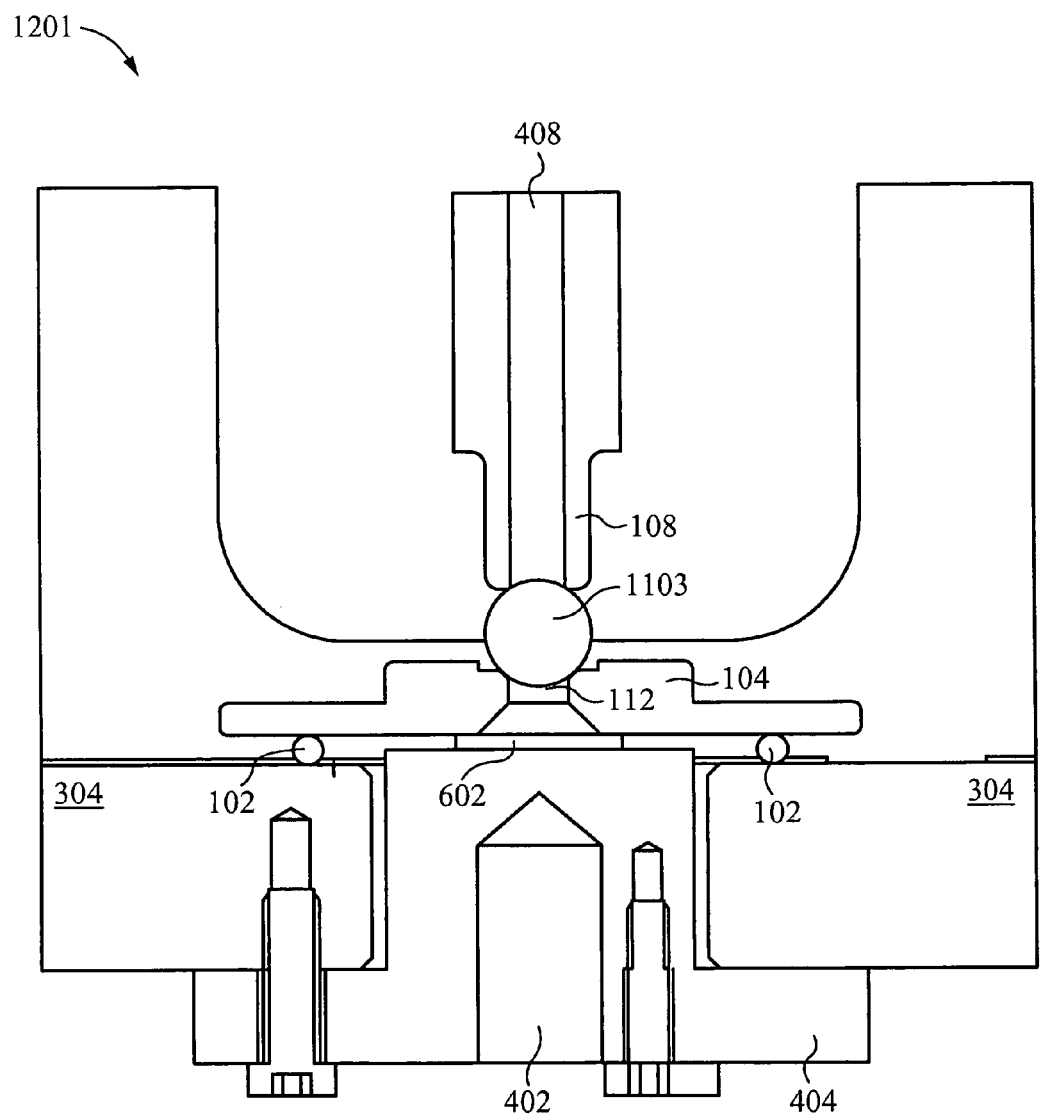
FIG. 12 is a close-up view of the lens aligning apparatus during the bell aligning of FIG. 11, in accordance with an embodiment of the present invention.

FIG. 12 is a close-up view 1201 of the lens aligning apparatus during the bell aligning 1101 of FIG. 11, in accordance with an embodiment of the present invention. The lockable lower chuck 104 is directly aligned with the bell alignment ball 1103. The top of the surface of the lockable lower chuck 104 includes a chamfer 112. The lower surfaces of the lower lens L2 are the adjacent counterbore bottom and wall of the chamfer 112 of the lockable lower chuck 104. Accordingly, it is important that the chamfer of the lockable lower chuck 104 is accurately machined relative to the counterbore surfaces of the lower lens L2. The coaxial aligning process 1101 is then complete.

More Details of Lens Doublet Aligning

Figure 3:
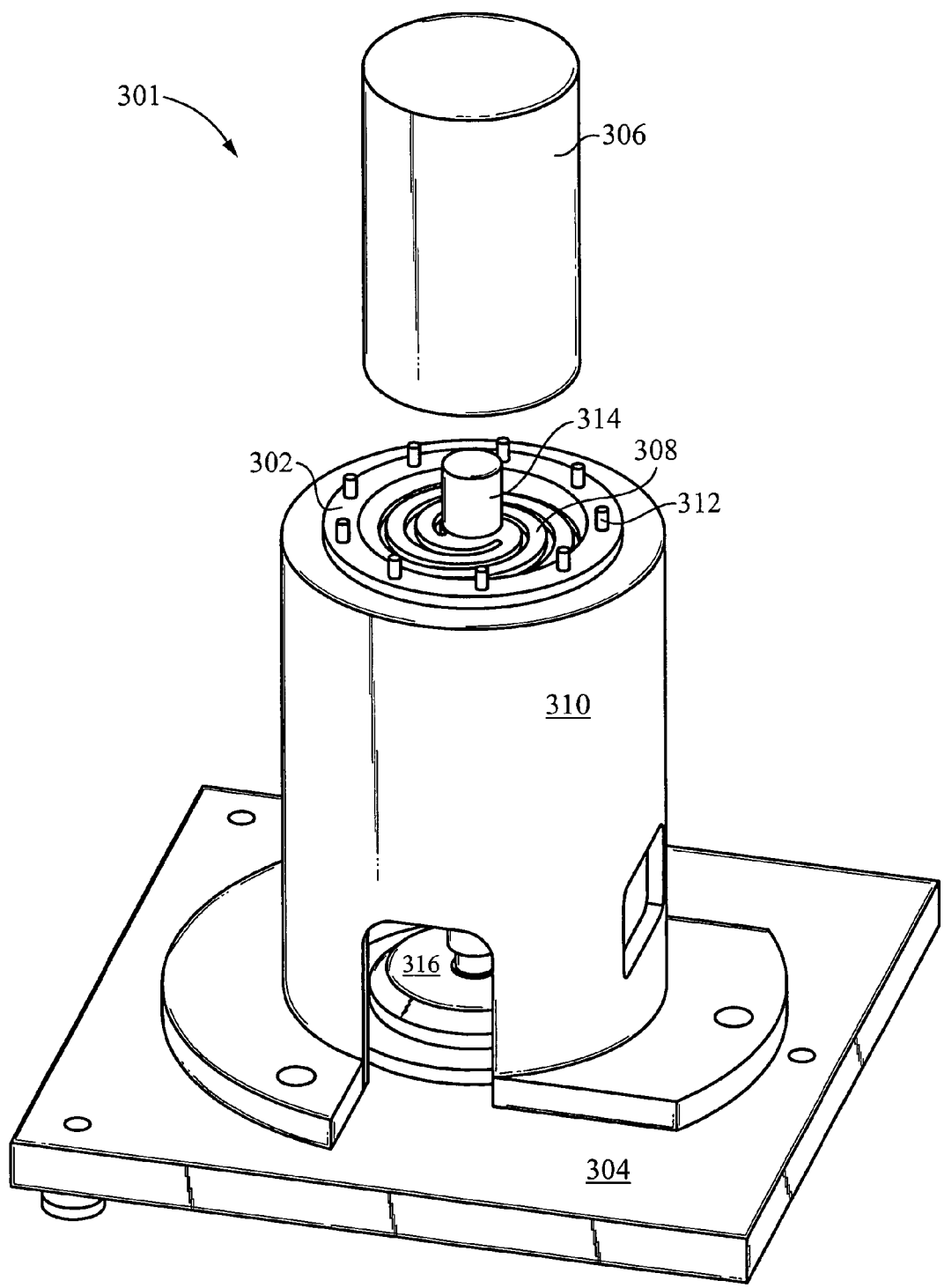
FIG. 3 is a perspective view of a lens aligning apparatus, in accordance with an embodiment of the present invention.

FIG. 3 is a perspective view 301 of a lens aligning apparatus, in accordance with an embodiment of the present invention. The lens aligning apparatus includes, among other things, a base plate 304, an actuator 306, a flexural clamp 302, a flexural bearing 308, a flexure housing 310, flexural clamp nuts 312, a top nut 314 and a floating lower chuck 316. The flexural clamp 302 secures the flexural bearing 308 into place.

Figure 4:
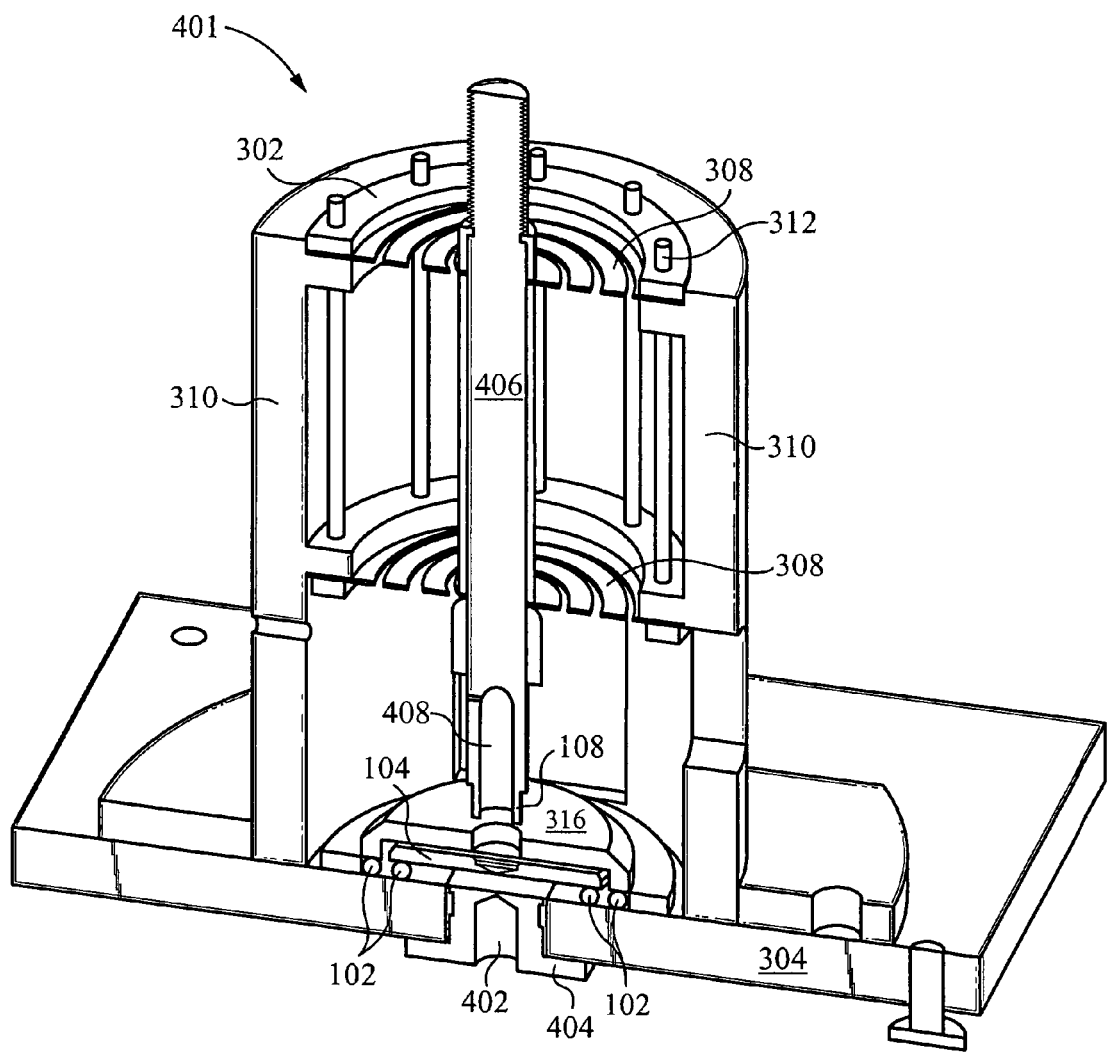
FIG. 4 is a cut-away perspective view of the lens aligning apparatus of FIG. 3, in accordance with an embodiment of the present invention.

FIG. 4 is a cut-away perspective view 401 of the lens aligning apparatus of FIG. 3, in accordance with an embodiment of the present invention. The lens aligning apparatus further includes, among other things, the upper bell chuck 108, an upper bell shaft 406 and a vacuum passage 408. The upper bell chuck 408 is attached at a lower end of the upper bell shaft 406. One or more flexural bearings 308 support the upper bell shaft 406 in an upright position. The upper bell shaft 406 traverses through a center of the one or more flexural bearings 308. The flexural bearing housing 310 is attached to outer radial edges of the flexural bearings 308. The flexural bearing housing 310 supports the one or more flexural bearings 308 within the flexural bearing housing. The base plate 304 supports the lockable lower chuck 104 and the flexural bearing housing on an upper portion of the base plate 304. A floating lower chuck 316 is positioned to float above the lockable lower chuck 104 and the base plate 304. The vacuum passage 408 passes traverses though a center axis of the upper bell chuck 108. The base plate 304 supports the mechanical insert 404, or heater 404, in a center portion of the base plate 304. The heater 404 includes a drilled hole 402 for reducing heat conduction occurring from heat coils to the base plate 304.

Figure 5:
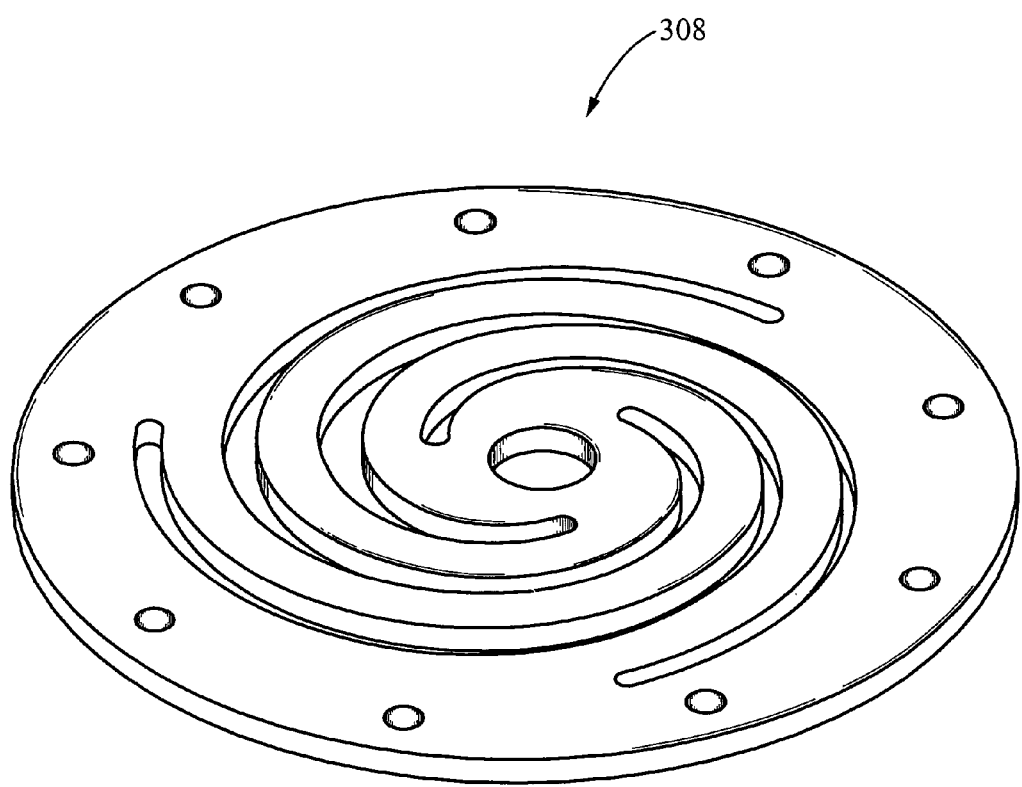
FIG. 5 is close-up view of the flexural bearing of the lens aligning apparatus, in accordance with an embodiment of the present invention.

FIG. 5 is a close-up view of the flexural bearing 308 of the lens aligning apparatus, in accordance with an embodiment of the present invention. Flexural bearings ensure highly repeatable linear translation of the upper bell chuck 108 with respect to lockable lower chuck 104. Additionally, stacks of flexural bearings 308 can be free to move to allow initial setup alignment and clamped to lock in the alignment.

Figure 6:
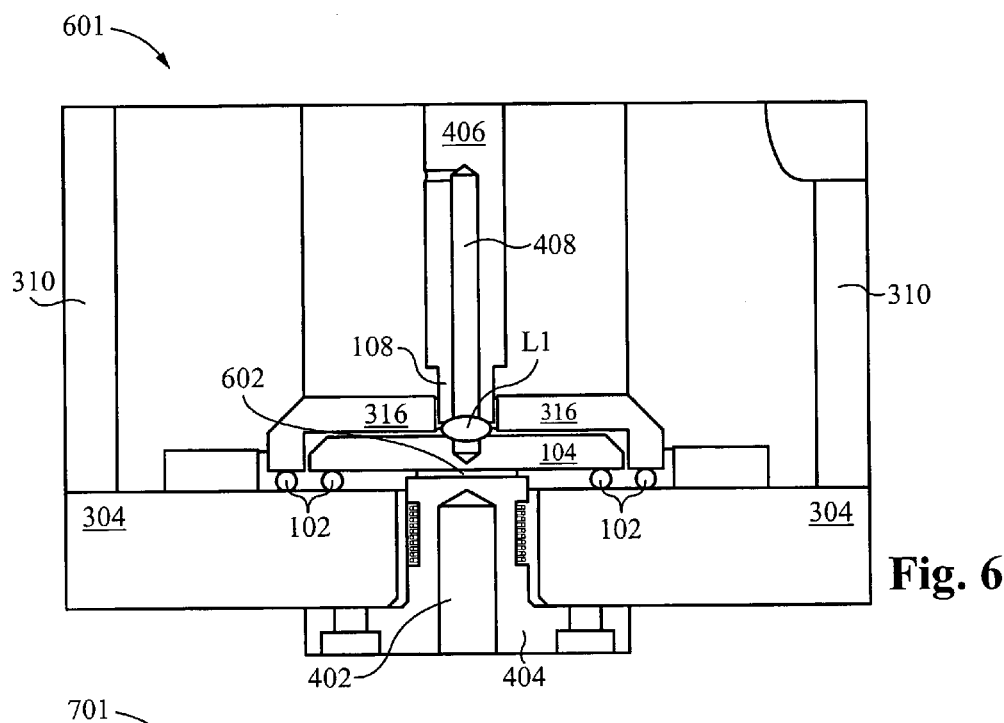
FIG. 6 shows the lens aligning apparatus during a lens aligning of the upper lens with respect to the upper bell chuck and the lower chuck, in accordance with an embodiment of the present invention.

FIG. 6 shows the lens aligning apparatus during an operation of lens aligning 601 of the upper lens L1 with respect to the upper bell chuck 108 and the lockable lower chuck 104, in accordance with an embodiment of the present invention. The upper lens L1 is placed in the lockable lower chuck 104 by hand after the upper bell chuck 108 is preferably raised approximately one quarter of inch (¼ in.) by a pneumatic cylinder of the upper bell chuck 108. Then, the upper bell chuck 108 is lowered first by the pneumatic cylinder and then by the voice coil 306. The upper lens L1 is seated between the upper bell chuck 108 and the lockable lower chuck 104 by the force of the voice coil 306, and is thereby aligned with the bell chucks. A vacuum passage 408 is used for subsequent handling of the upper lens L1. The floating lower chuck 316, discussed above with reference to FIG. 4, is optional. There are at least three supporting balls 102 (two shown) to support the floating lower chuck 316 above the base plate 304. As discussed above with reference go FIG. 1, there are at least three supporting balls 102 (two shown) to support the lockable lower chuck 104 above the base plate 304.

Figure 7:
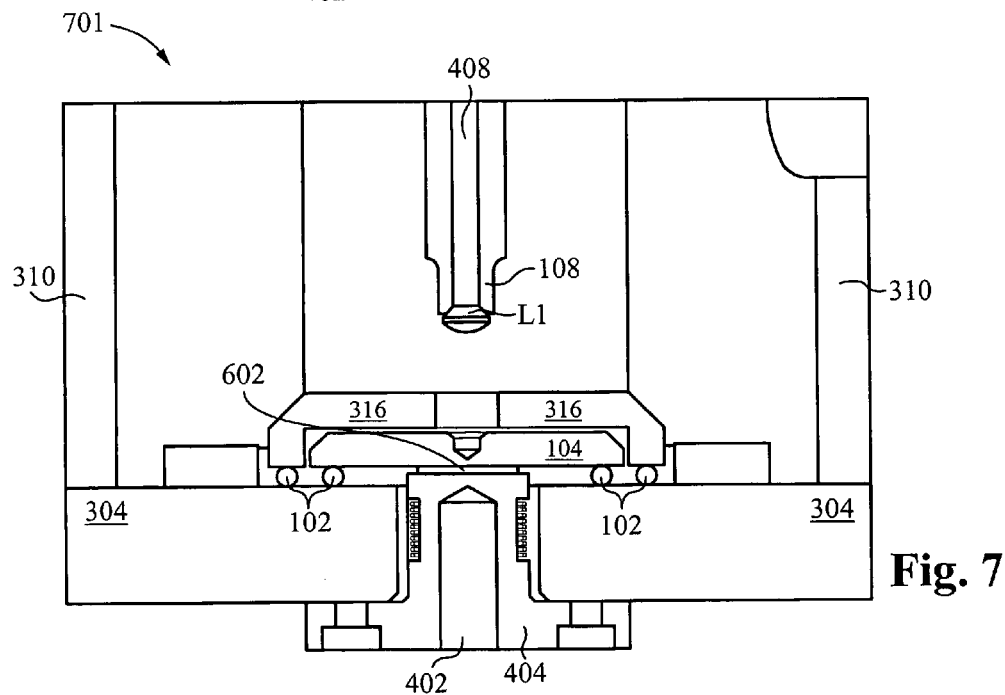
FIG. 7 shows the lens aligning apparatus during a lens raising of the upper lens in preparation for placement of the lower lens, in accordance with an embodiment of the present invention.

FIG. 7 shows the lens aligning apparatus during a lens raising 701 of the upper lens L1 in preparation for placement of the lower lens L2, in accordance with an embodiment of the present invention. The vacuum passage 408 applies suction to the upper lens L1. Accordingly, the upper lens L1 is raised first by the voice coil 306, then by the pneumatic cylinder as the upper bell chuck 108 is raised.

Figure 8:
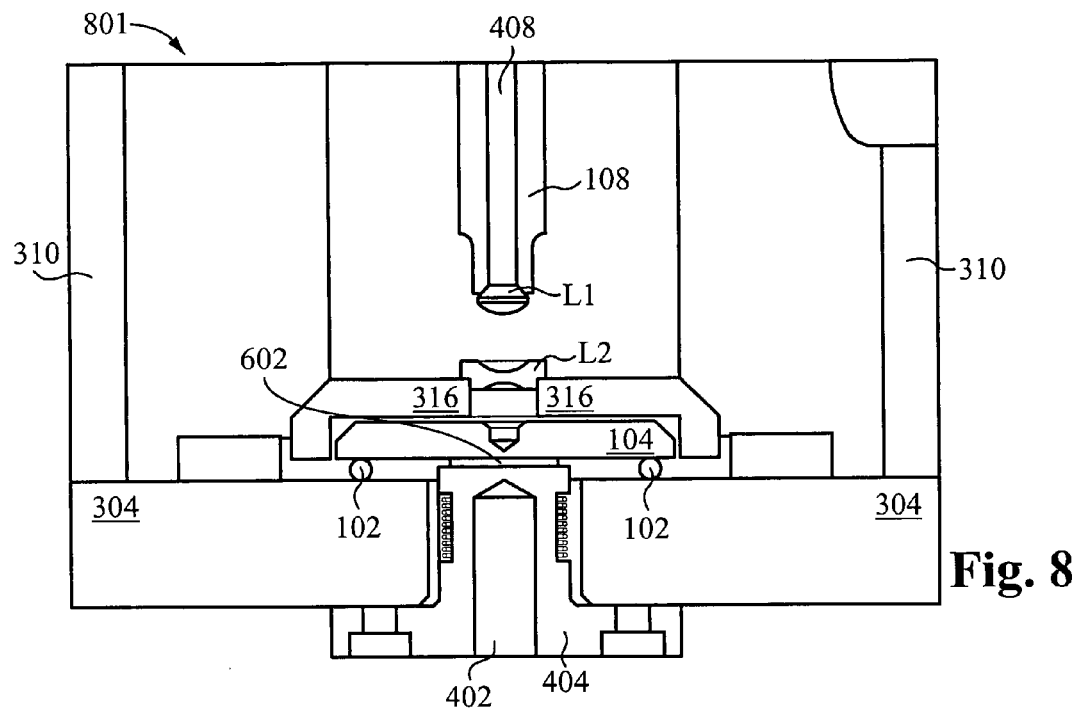
FIG. 8 shows the lens aligning apparatus during a lens placement of the lower lens, in accordance with an embodiment of the present invention.

FIG. 8 shows the lens aligning apparatus during a lens placing 801 of the lower lens L2, in accordance with an embodiment of the present invention. The lower lens L2 is precisely held to be horizontal via edge datums 110 between the lower lens L2 and the lockable lower chuck 104.

Figure 9:
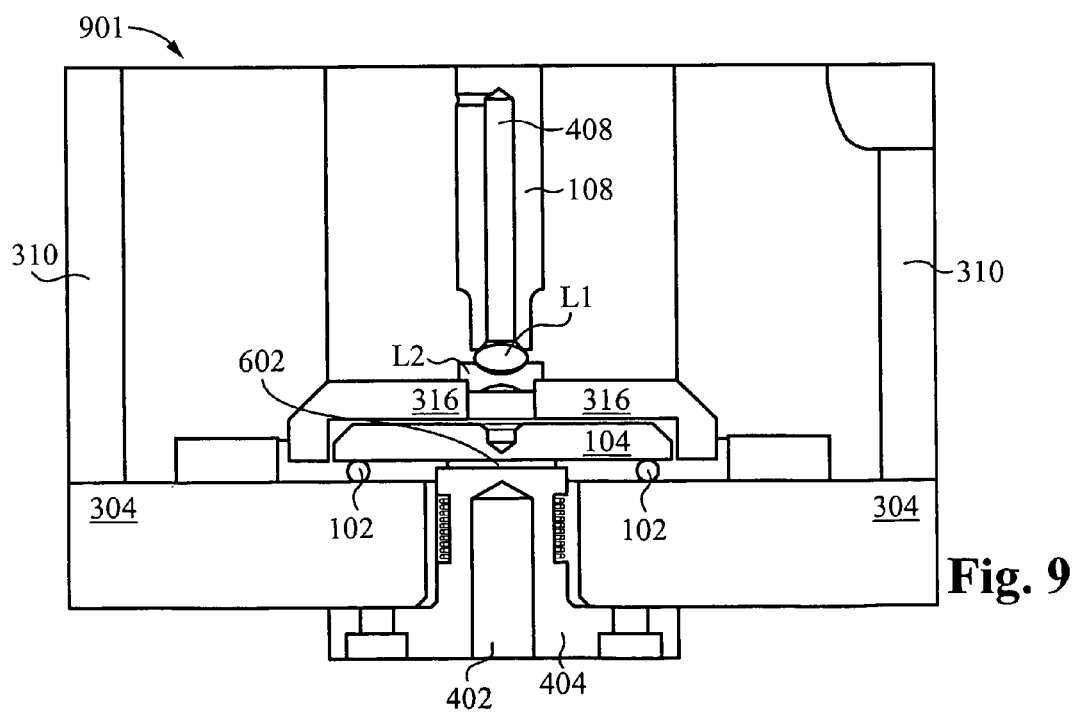
FIG. 9 shows the lens aligning apparatus during a lens aligning of the upper lens with respect to the lower lens, in accordance with an embodiment of the present invention.

FIG. 9 shows the lens aligning apparatus during a lens aligning 901 of the upper lens L2 with respect to the lower lens L2, in accordance with an embodiment of the present invention. The upper lens L1 is lowered onto the lower lens L2.

In the method of lens aligning according to FIG. 1, the lockable lower chuck 104 is free to translate radially. Such radial freedom enhances alignment of the upper lens L1 with respect to the lower lens L2, as discussed with reference to FIG. 1. The natural alignment of the optical surfaces of the upper lens L1 and the lower lens L2 is assured by a natural mating of the optical surfaces. When the ring on L2 is of diameter larger than a critical value to allow bell centering based on the critical angle for friction. The natural mating of the optical surfaces occurs because the lockable lower chuck 104 is free to translate radially. Accordingly, to some extent, the lens aligning apparatus relies on the ability of the lower lens L2 to self-align with the upper lens L1 via the radial freedom of the lockable lower chuck 104. This self-alignment of the lenses uses the upper surface of the lockable lower chuck 104 while perpendicular to the upper bell chuck 108. This perpendicularity is accomplished during a previous perpendicularity aligning process 1001 of the upper bell chuck 108. This perpendicular aligning process 1001 is discussed above with reference to FIG. 10.

On the other hand, in the method of lens aligning according to FIG. 2, the lockable lower chuck 104 is fixed with respect to the upper bell chuck 108. In this embodiment, the upper bell chucks undergoes a previous coaxial aligning process 1101 and is fixed into coaxial alignment. This coaxial aligning process 1101 is discussed above with reference to FIG. 11.

Once the lenses are aligned, the lenses are ultra-violet (UV) cured into a doublet assembly. The upper bell chuck 108 is raised using the pneumatic cylinder. Then, the doublet assembly is removed by hand from the lens aligning apparatus.

Advantageously, the present invention is much lower in cost than conventional methods when considering capital and operator labor. A reason for this costs savings is due to the passive aligning of the lower lens L2 to the upper lens L1. This passive aligning is enabled by a previous aligning of the upper bell chuck 108 and the lockable lower chuck 104. The upper bell chuck 108 undergoes perpendicular bell aligning with respect to the lockable lower chuck 104, as discussed with reference to FIG. 10. The lockable lower chuck 104 undergoes coaxial bell aligning with respect to the upper bell chuck 108, as discussed with reference to FIG. 11. The bell aligning utilizes, among other things, an alignment ball 1103, supporting precision balls 102 and curing epoxy 602 to affix the lockable lower chuck 104 after aligning the lockable lower chuck 104.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of bell chuck aligning in a lens doublet aligning apparatus, the method comprising:
    positioning an alignment tool with respect to a base plate of the lens doublet aligning apparatus;
    positioning an upper bell shaft with respect to the alignment tool, wherein the upper bell shaft includes an upper bell chuck at a lower end of the upper bell shaft; and
    tightening flexural bearings around an outer radial edge of the upper bell shaft, wherein the flexural bearings precisely hold the upper bell shaft into perpendicular alignment in the lens doublet aligning apparatus.

2. The method of claim 1, wherein the alignment tool comprises of low coefficient of thermal expansion material.

3. The method of claim 2, wherein the low coefficient of thermal expansion material is acetal.

4. The method of claim 1, wherein the upper bell shaft comprises of stainless steel.

5. The method of claim 1, wherein the positioning an upper bell shaft with respect to the alignment tool comprises contacting the upper bell shaft with a sleeve, wherein the sleeve shares a coaxial center with the alignment and is support in the alignment tool.

6. The method of claim 5, positioning an upper bell shaft with respect to the alignment tool comprises:
    cooling the alignment tool, the sleeve, the base plate, the upper bell shaft and the upper bell chuck; and
    mating the alignment tool and base plate to the upper bell chuck.

7. The method of claim 6, wherein the alignment tool, the sleeve, the base plate, the upper bell shaft and the upper bell chuck are cooled to approximately −20 degrees C.

8. The method of claim 6, wherein positioning an upper bell shaft with respect to the alignment tool further comprises warming the alignment tool, the sleeve, the base plate, the upper bell shaft and the upper bell chuck to room temperature.

9. The method of claim 8, wherein positioning an upper bell shaft with respect to the alignment tool further comprises:
    cooling again the alignment tool, the sleeve, the base plate, the upper bell shaft and the upper bell chuck; and
    removing the alignment tool from the lens doublet aligning apparatus while the alignment tool, the sleeve, the base plate, the upper bell shaft and the upper bell chuck are still cold.

10. The method of claim 9, wherein removing the aligning tool from the lens doublet aligning apparatus comprises:
    unscrewing a screw holding the aligning tool to the base plate; detaching the base plate from a flexural bearing housing; and
    slipping the alignment tool off the upper bell chuck.

11. The method of claim 9, wherein the positioning an upper bell shaft with respect to the alignment tool further comprises:
    warming the base plate, the upper bell shaft and the upper bell chuck to room temperature; and
    fastening the base plate, the upper bell shaft and the upper bell chuck to the flexure housing.

12. The method of claim 1, wherein the tightening the flexural bearings around an outer radial edge of the upper bell shaft comprises clamping the flexural bearings into alignment at inner and outer surfaces of the flexural bearings.

13. The method of claim 12, wherein clamping the flexural bearings comprises tightening a top nut of the upper bell shaft and tightening flexural clamp nuts.

14. The method of claim 1, wherein perpendicular alignment is defined by an outer radial edge of the upper bell shaft with respect to a top surface of the base plate.

15. An apparatus for aligning an upper bell chuck of a lens doublet aligning apparatus, the apparatus comprising:
    an upper bell chuck supported by an upper flexural bearing;
    an upper bell shaft having the upper chuck attached at a lower end of the upper bell shaft;
    one or more shaft flexural bearings, wherein the one or more shaft flexural bearings support the upper bell shaft in an upright position, wherein the upper bell shaft traverses through a center of the one or more shaft flexural bearings;
    a flexural bearing housing attached to outer radial edges of the shaft flexural bearings, wherein the shaft flexural bearing housing supports the one or more shaft flexural bearings within the shaft flexural bearing housing;
    a lower chuck supported by a lower flexural bearing;
    a base plate supporting the lower chuck and the shaft flexural bearing housing on an upper portion of the base plate; and
    an alignment tool sharing coaxial alignment with the base plate.

16. An apparatus for aligning a lower chuck with respect to an upper bell chuck of a lens doublet aligning apparatus, the apparatus comprising:
    an upper bell chuck supported by an upper flexural bearing;
    an upper bell shaft having the upper chuck attached at a lower end of the upper bell shaft;
    one or more shaft flexural bearings, wherein the one or more shaft flexural bearings support the upper bell shaft in an upright position, wherein the upper bell shaft traverses through a center of the one or more shaft flexural bearings;
    a shaft flexural bearing housing attached to outer radial edges of the one of more shaft flexural bearings, wherein the shaft flexural bearing housing supports the one or more shaft flexural bearings within the shaft flexural bearing housing;
    a lower chuck supported by a lower flexural bearing;
    a base plate supporting the lower chuck and the shaft flexural bearing housing on an upper portion of the base plate; and
    an alignment ball clamped between the upper bell chuck and the lower chuck.

* * * * *